J. F. IANNELLI.
SCARF PIN.
APPLICATION FILED MAR. 9, 1909.
949,707.
Patented Feb. 15, 1910.
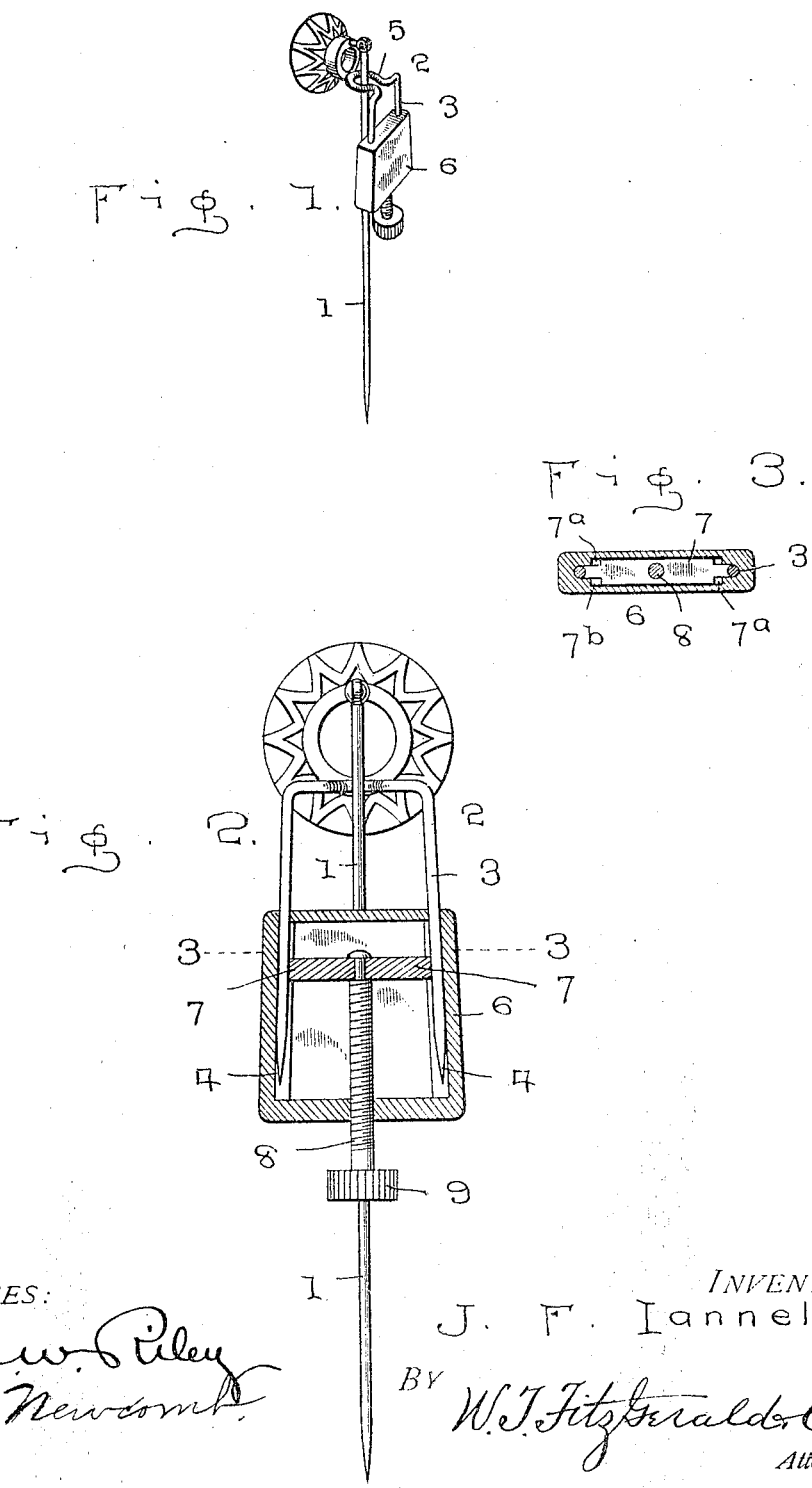
WITNESSES:
Thos. W. Riley
M. A. Newcomb
INVENTOR
J. F. Iannelli
BY W. J. Fitzgerald & Co.,
Attorneys

UNITED STATES PATENT OFFICE.

JOSEPH FRANCIS IANNELLI, OF BROOKLYN, NEW YORK, ASSIGNOR OF ONE-HALF TO SALVATOR PELOSO.

SCARF-PIN.

949,707.     Specification of Letters Patent.     Patented Feb. 15, 1910.

Application filed March 9, 1909. Serial No. 482,321.

*To all whom it may concern:*

Be it known that I, JOSEPH F. IANNELLI, a citizen of the United States, residing at Brooklyn, in the county of Kings and State of New York, have invented certain new and useful Improvements in Scarf-Pins; and I do hereby declare the following to be a full, clear, and exact description of the invention, such as will enable others skilled in the art to which it appertains to make and use the same.

My invention relates to new and useful improvements in scraf pins, more particularly to what may be termed safety attachments therefor.

As indicated, it has more particularly for its object to effect the retention of the pin in position against being accidentally detached from the scarf or being lost.

It also has for its object to carry out the aforesaid purposes in a simple and effective manner.

Other objects and advantages will be hereinafter referred to and more particularly pointed out in the claims.

In the accompanying drawings illustrating the preferred embodiment of my invention, Figure 1 represents a perspective view thereof. Fig. 2, an enlarged rear elevation of the same partly in vertical section, and, Fig. 3 is a cross section produced on line 3—3, Fig. 2.

Referring to the drawings in which similar reference numerals designate corresponding parts throughout the several views, 1 indicates an ordinary straight scarf pin, which is pivotally attached to any suitable form of ornament, said ornament also being provided with a right-angled fork-like attachment 2, having the terminals of its tines 3 pointed as at 4. The right-angled appendage or attachment 2 has its upper end horizontal portion formed in loop fashion, as at 5, the forward edge of which is soldered or otherwise fixed to the back of the ornament at its lower edge and through this loop freely extends the pin 1. The vertical members or tines of said appendage 2, extend substantially parallel to each other and are received by a slide or inclosure 6 and within said inclosure is arranged a locking plate 7, with its lateral edges engaging the vertical portions or tines 3 of the member 2, the lateral inner surface of said inclosure being preferably slightly inclined upwardly and inwardly. Said locking plate or member 7 has lateral shoulders 7$^a$ formed thereon, which engage with corresponding shoulders 7$^b$ of the inclosure 6 for the guidance of said locking member in suitable position as it is actuated by the screw 8, as will be readily appreciated.

The locking plate or member 7 is carried by a screw 8 passing through the lower end or bottom of the inclosure 6 and has its lower projecting end provided with a preferably milled thumb-piece or head 9 for the ready manipulation of said screw with the locking plate or member 2, said screw having threaded engagement with the inclosure 6.

It will be noted that in applying the pin, the member 6 is first removed from the member 3 by suitably relaxing the pressure of the locking member 7 and inserting the pin 1 together with the tines 3 of the member 2 into the scarf, said tines being allowed to suitably project beyond the rear portion of the scarf and the same again re-inserted into the inclosure 6 through the openings provided in the upper part of the member 6 for the reception of said tines. By now suitably grasping the head 9 of the screw 8 and suitably manipulating the same, the locking plate or member 7 is engaged with the tines 3 of the member 2, forcing them into locking engagement with the lateral inclined portions of the inclosure 6, thus securing said member in locked position.

It will be noted that this device may be used also in connection with brooches, ladies' pins, men's shirt studs and for other like purposes, it being understood that no restriction is placed upon the invention, as to its use, or as to the unessential details of the arrangement and construction of the parts.

What I claim is:

1. A device of the character described comprising an ornamental pin, a right angled member having horizontal and vertical portions, said horizontal portion forming a loop secured to the rear edge of the ornament of said pin and receiving said pin, the vertical portions of said member forming tines, a slide adapted to receive said tines and having ways in its inner lateral edges also receiving said tines, a plate adapted to engage said tines and guided within said ways, a screw connected to said plate and having screw threaded engagement with said slide, said screw being provided with means for its manipulation.

2. A device of the character described, comprising an ornamental pin, a right-angled member or appendage having its horizontal portion formed into a loop fixed to the rear edge of the ornament of said pin and having its vertical portions adapted to form pointed tines and locking means consisting of a sliding inclosure receiving said tines and its inner lateral edges inclined inwardly and upwardly and formed with shoulders upon opposite sides of said tines and a locking plate arranged in said inclosure and having shoulders engaging the aforesaid shoulders and provided with an actuating screw having threaded engagement with said inclosure.

In testimony whereof I have signed my name to this specification in the presence of two subscribing witnesses.

JOSEPH FRANCIS IANNELLI.

Witnesses:
   GERARD GARRAMONE,
   JAMES ELIN.